Patented July 4, 1950

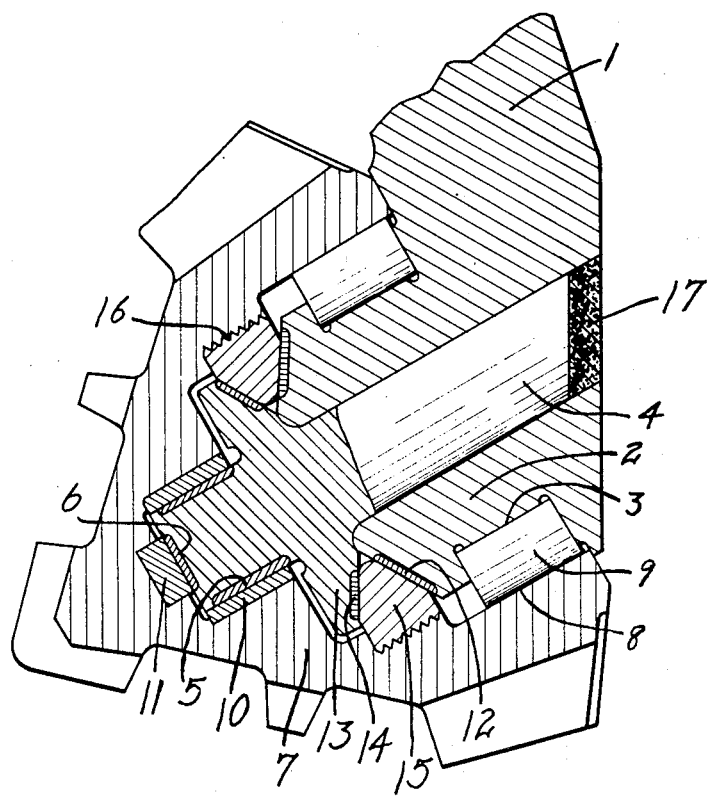

2,513,634

UNITED STATES PATENT OFFICE 2,513,634

CONE BIT BEARING

Walter C. Francis, Houston, Tex., assignor to Reed Roller Bit Company, Houston, Tex., a corporation of Texas Application April 19, 1946, Serial No. 663,551

7 Claims. (Cl. 308—35)

This invention has to do with bearings for the rolling cutters of rotary earth drilling bits and has for its object the provision of an improved means for securing such cutters in place on their spindles and transmitting the end thrusts from such cutters to their spindles.

It is a more specific object of this invention to provide a bearing structure of the type referred to in which the thrust taking and locking portions of the bearing may take both radial and thrust load, will be provided with a maximum bearing area, and may be adjusted to a snug fit both in an axial and in a radial direction during assembly.

A still further object of this invention is to provide such a locking and thrust taking arrangement which will provide a greater bearing area than possible with the usual type of antifriction locking and thrust taking arrangement, and in which take up for wear due either to radial or thrust stresses may be readily compensated for with a single adjustment.

Other objects and advantages of this invention will become apparent from the following description taken in connection with the accompanying drawing wherein is illustrated by way of example one embodiment of the invention.

The single figure of the drawing shows a longitudinal cross section through a cutter and bearing constructed in accordance with this invention.

With reference more particularly to the drawing, the numeral 1 designates the leg of a bit head having a downwardly and inwardly extending bearing cutter spindle part 2 thereon. This cutter spindle part 2 may, if desired, have suitable provision thereon for receiving a radial bearing, such provision being illustrated in the drawing as a roller raceway 3.

The spindle also includes a second part having a pin portion 4 extending into an axial bore through the first spindle part 2. This second spindle part may be provided adjacent its end with a hard surfaced radial bearing zone 5, and with a hard surfaced thrust bearing area 6 on its end.

Encompassing the composite spindle just described the drawing illustrates a rolling cutter 7 which in this instance is of the type known as a cone cutter. The cutter 7 adjacent its larger or base end has an inner cylindrical race 8 which when the cutter is properly positioned on the spindle opposes the race 3, providing for the rollers 9 so as to form a radial roller bearing substantially at the base of the cutter. Likewise, adjacent the nose or point of the cutter the opening therein is provided with a zone having a bearing liner 10 adapted to cooperate with the zone 5 on the spindle to provide a radial friction bearing for the cutter. At the inner end of the opening in the cutter there is likewise provided a bearing insert 11 adapted to receive the thrust bearing surface 6 on the spindle to provide a bearing for taking end thrusts from the cutter toward the leg 1.

In order to provide a combined radial and thrust bearing for holding the cutter 7 on the spindle and taking both radial stresses and end thrusts in both directions, a combined radial and thrust bearing structure such as illustrated is provided. This structure consists of a hard surfaced frusto-conical portion 12 on the end of the spindle part 2, the same being inclined outwardly and away from the end of this spindle part, a radial flange 13 on the second spindle part adjacent the end of the spindle part 2 and having a hard faced frusto-conical bearing surface 14 opposed to and flaring away from the surface 12 to provide a V-shaped opening between them, and a bearing member 15 secured by any suitable means such as the threads 16 within the cutter 7 and extending radially into the V-shaped opening or groove between the surfaces 12 and 14. It will be noted that this bearing member 15 is shown as an annular member shaped with its inwardly projecting portion of V-shaped cross section adapted to mate with the surfaces 12 and 14, but having its innermost extremity rounded to prevent it from engaging the bottom of the V-shaped groove between the surfaces 12 and 14, but it will be appreciated that the bearing member 15 may not in every case extend throughout the complete annulus and that it may have various cross sections within the scope of this invention so long as the same are consistent with the stated objects and functions of the invention.

In assembling the bearing illustrated in the drawing, assuming the wear surfaces on the spindle parts and in the cutter to have been properly placed thereon and therein, the spindle part having the pin 4 will first be placed in the cutter after which the annular bearing member 15 will be secured in the cutter by means of the threads 16 or other suitable securing means. The rollers 9 will then be placed about the spindle part 2 in the race 3, heavy grease or the like being employed to hold them in position until the cutter can be placed about them. The end of the pin 4 will then be inserted in the bore through the spindle part 2 and the cutter moved over the spindle part 2 to the position illustrated in the drawing. The pin 4 may be moved into the bore in the spindle part 2 until the bearing surfaces 12 and 14 are in engagement with the desired degree of tightness with the bearing member 15, whereupon the pin 4 will be welded in place by means of weld metal 17.

It will be seen that in actual operation the bearing provided by the surfaces 12 and 14 and the bearing member 15 will take end thrust in both directions from the cutter 7 and will in addition provide a radial bearing for the cutter. In addition to the fact that these parts provide a two directional end thrust bearing and a radial bearing, it will be seen that they may readily be adjusted to the desired degree of tightness both from the standpoint of their thrust bearing functions and from the standpoint of their radial bearing function by a single axial movement of the pin 4 into the spindle part 2, and that these two spindle parts may be secured in any desired position of adjustment with respect to each other by means of the welding 17. It is even possible if the bearing surfaces 12 and 14 or the bearing member 15 wears to such an extent that a take up of this bearing seems desirable, to cut out the welded connection 17 with a suitable torch in a well-known manner, and to readjust the bearing by allowing the pin 4 to move further into the spindle part 2 and then rewelding it as at 17.

It will be appreciated that although this bearing has been illustrated in use in a cone type of rolling cutter, it is also applicable to a cutter in which both ends are opened. It will also be appreciated that while in many instances it is of considerable advantage and very desirable to have radial bearings on opposite sides of the combined radial and thrust bearing above described, all as illustrated in the drawing, it is entirely conceivable that one or the other or both of the radial bearings illustrated on opposite sides of the thrust bearing in the drawing might be dispensed with under certain circumstances.

The surfaces 12 and 14 are illustrated as being on substantially the same axial with respect to the axis of the spindle, but it will readily be apparent that they may be made on different axles if so desired for any reason without, however, departing from the scope of this invention.

Having described my invention, I claim:

1. A spindle and cutter combination for an earth boring drill comprising a two part spindle, said two parts having opposed frusto conical bearing surfaces forming a circumferentially V-shaped groove between them, an annular bearing member secured within said cutter and extending radially therefrom into said V-shaped groove to provide a radial and thrust bearing engagement with said bearing surfaces, and means for securing said two spindle parts to each other with said bearing surfaces in snug bearing engagement with said annular bearing member.

2. A spindle and cutter combination for an earth boring drill comprising a spindle having a V-shaped bearing groove extending thereabout and presenting opposed frusto-conical bearing surfaces, a cutter encompassing said spindle and an annular bearing member secured within said cutter and extending into said V-shaped bearing groove in bearing engagement with said bearing surfaces.

3. A spindle and cutter combination for an earth boring drill comprising a spindle having opposed frusto-conical bearing surfaces providing a circumferential V-shaped groove between them, a cutter encompassing said spindle, an annular radial and thrust bearing member secured within said cutter and extending into said groove to provide a combined radial and two-direction thrust bearing for transmitting radial stresses and thrusts in either direction from said cutter to said spindle, and radial bearing means between said cutter and said spindle on opposite sides of said combined radial and thrust bearing.

4. A spindle and cutter combination for an earth boring drill, said spindle comprising two parts having opposed frusto-conical bearing surfaces forming a circumferential V-shaped groove between them, a bearing member secured within said cutter and extending radially therefrom into said V-shaped groove to form a radial and thrust bearing engagement with said bearing surfaces, and means for securing said two spindle parts to each other with said bearing surfaces in snug bearing engagement with said annular bearing member.

5. A spindle and cutter combination for an earth boring drill comprising a spindle having a V-shaped bearing groove extending thereabout and presenting opposed frusto-conical bearing surfaces, a cutter encompassing said spindle and a bearing member within and carried by said cutter and extending into said V-shaped bearing groove in bearing engagement with said bearing surfaces.

6. A spindle and cutter combination for an earth boring drill comprising a spindle having a V-shaped bearing groove extending thereabout and presenting opposed bearing surfaces, a cutter encompassing said spindle and a bearing member within and carried by said cutter and extending into said V-shaped bearing groove in bearing engagement with said bearing surfaces.

7. A spindle and cutter combination for an earth boring drill comprising a spindle having opposed bearing surfaces providing a circumferential V-shaped groove between them, a cutter encompassing said spindle, a radial and thrust bearing member within and carried by said cutter and extending into said groove to provide a combined radial and two-direction thrust bearing for transmitting radial stresses and thrusts in either direction from said cutter to said spindle, and radial bearing means between said cutter and said spindle on opposite sides of said combined radial and thrust bearing.

WALTER C. FRANCIS.

REFERENCES CITED

The following references are of record in the file of this patent:

UNITED STATES PATENTS

| Number | Name | Date |
| --- | --- | --- |
| 2,992,036 | Behnke | Aug. 4, 1942 |
| 2,351,357 | Miller et al. | June 13, 1944 |

FOREIGN PATENTS

| Number | Country | Date |
| --- | --- | --- |
| 553,068 | France | 1923 |